United States Patent Office 2,898,689
Patented Aug. 11, 1959

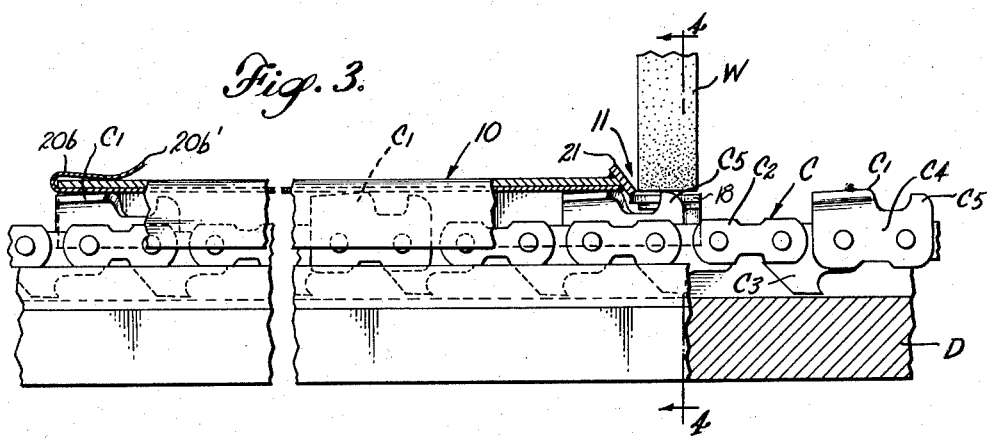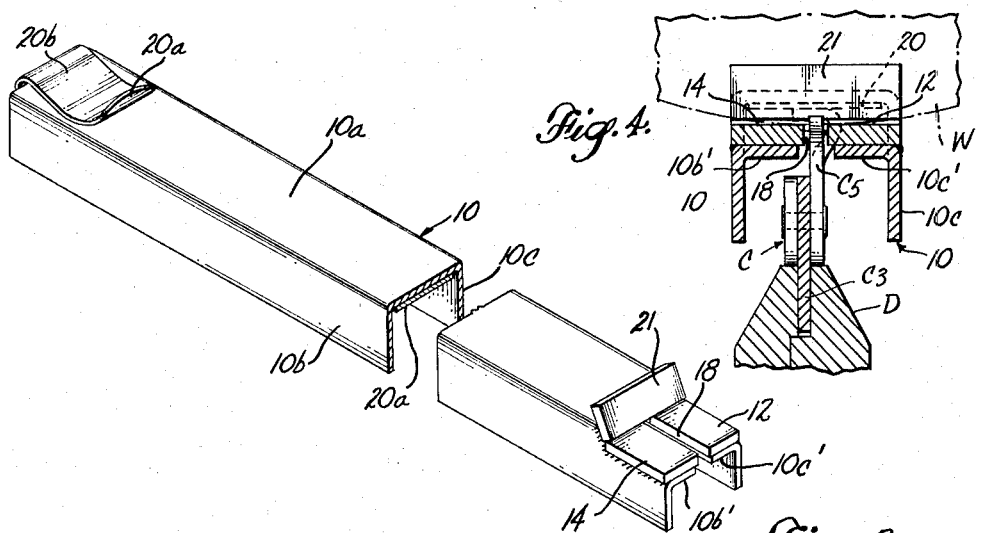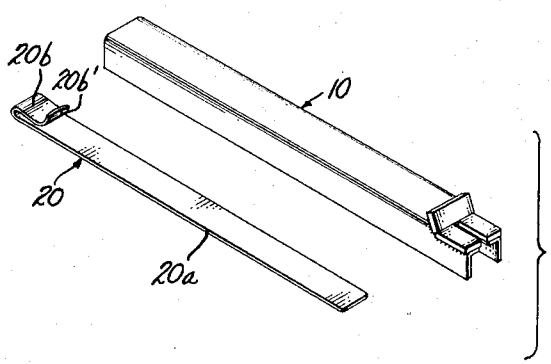

2,898,689

ADJUSTABLE GAUGE FOR DRESSING SAW CHAIN DEPTH GAUGES

Wade H. Mills, Kosmos, Wash.

Application July 21, 1958, Serial No. 749,789

5 Claims. (Cl. 33—202)

This invention relates to a new and improved adjustable gauge intended as a guide or reference for use in dressing the depth gauges of saw chains to predetermined depths relative to the plane of the adjacent chain cutter tips. The invention is herein illustratively described by reference to the presently preferred form thereof; however, it will be recognized that certain modifications and changes therein with respect to details may be made without departing from the essential features involved.

It is well known in the art that the cutting efficiency of a chain saw depends upon, among other conditions, the uniform accuracy with which the tops of the depth gauges or "rider," as they are sometimes termed, are dressed in relation to the tops of the adjoining cutters in the chain. Moreover, it is also well known that the depth relationship of the depth gauge tops and cutter tops should be different for different cutting conditions or materials. Recognizing this need, efforts have been made heretofore to develop adjustable grinding or filing gauges by which the saw chain depth gauges could be dressed to the proper height for a given type of work. Common to these endeavors was the provision of a gauge device having a platen adapted to rest upon two or more of the cutters in a straight stretch of the chain, with a notch being provided through which an intermediate or adjoining depth gauge could project upwardly above a datum plane or matrix surface provided in the grinding gauge in order to permit filing or grinding down the depth gauge top accurately to the datum level. In some instances complete and separate gauges were provided for each of different amounts of offset or clearance to be achieved between the depth gauge tips and the cutter tips. This was an expensive and somewhat inconvenient arrangement because of the number of separate gauges required and their combined bulk. Another endeavor was to provide an adjustable single gauge by utilizing a spacer element beneath the platen which element was movable toward and from the platen by calibrated amounts through the manipulation of a calibrated adjusting screw. However, calibration was difficult and the factors of wear, free play between relatively movable parts and inexperience in the use of such a device resulted in inaccuracies. Moreover, such a device is subject to damage and is relatively expensive to produce in an accurate and consistently reliable form.

The present invention is directed to the elimination of these problems and to the provision of an adjustable depth gauge which is relatively inexpensive, compact, simple and is so constituted as to be usable with a rotary grinding wheel.

Another object of the invention is to provide a rugged, relatively tamper-proof and damage-proof adjustable depth gauge which may be used successfully by amateurs as well as professional maintenance personnel. A further object is such a gauge, the accuracy of which is not appreciably affected by use, due to the wearing qualities of its parts.

The particular features of the invention, together with the foregoing and related objects and advantages thereof will become more fully evident from the following description thereof by reference to the accompanying drawings.

Figure 1 is a perspective view illustrating the novel gauge including the gauge proper and detachable shim means associated therewith.

Figure 2 is a perspective view at larger scale showing the gauge with a shim means installed on the gauge.

Figure 3 is a side view of a stretch of saw chain with the adjustable gauge operatively positioned thereon and a grinder wheel in use to dress down one of the depth gauge elements on the saw chain, parts being broken away to reveal details of construction.

Figure 4 is a transverse section taken on line 4—4 in Figure 3.

Referring to the drawings, the gauge proper comprises an elongated channel 10 of steel or other suitable metal comprising a web 10a and opposite mutually parallel flanges 10b and 10c projecting from the edges of the web and extending along the length thereof. The web 10a is of uniform thickness and comprises the gauge platen. At one end the web is removed along a transverse line or break to form a notch 11. Along the length of the notch the upper portions of the flanges 10b and 10c are bent inwardly toward each other in coplanar relationship to form tabs 10b' and 10c', respectively. These tabs serve as supports to and upon which coplanar matrix strips 12 and 14 are bonded as by silver soldering or other suitable bonding method. These matrix strips are of tungsten carbide or other relatively hard material which will resist grinding or filing without appreciable wear. The matrix strips 12 and 14 are spaced apart, as are the adjacent edges of the bent flange portions 10b' and 10c' to form a slot 18 of a sufficient width and length to accommodate freely a saw chain depth gauge therebetween. Preferably, a retaining strip or heel 21 of similar hardened material is bonded to the foreshortened end of the web or platen 10a as shown in order to provide a stop preventing the grinding wheel from slipping past the working area and inadvertently grinding the body of the channel. Preferably the strip 20 is inclined away from the matrix strips in the illustrated manner.

The length of the platen or web 10a is sufficient to overlap two or more saw chain cutters so as to permit its lower or inside face to rest simultaneously upon the tops of such cutter and thus provide a reference for establishing the datum level represented by the top faces of insets 12 and 14 to which individual saw chain depth gauges may be dressed.

In Figure 3 there is shown a stretch of saw chain C which comprises the cutters C1, the blade or guide arm D about which the chain circulates, connecting links C2, and the further connecting links C3 which interconnect the links C2 and the cutter blocks C4. Each cutter block carries a depth gauge C5 located forwardly of the cutting edge of the cutter C1. In the illustration, the saw chain includes no raker teeth, but it will be understood that raker teeth may be included in the chain between the cutter blocks if desired. Raker teeth do not project to the level of the cutters C1, hence do not interfere with the use of the adjustable gauge. The novel gauge of this invention may be used in various types of saw chains.

For some applications, the gauge as thus far described may be used without any means for varying or changing its reference level with relation to the cutters which it engages for reference purposes. This is done simply by placing the gauge over a straight stretch of saw chain so that the underlying surface of the platen 10a rests directly in contact with the upper edges of two or more of the cutters C1. The notch 18 is then positioned to admit a depth gauge C5 so that the top of the depth gauge projects upwardly between the sides of the slot 18. Its excess projection above the upper surfaces of the strips is quickly ground off by use of a grinding wheel W, a file or other abrasive tool. Thereupon, with the grinding gauge retracted or removed the leading or forward corner of the depth gauge C5 is rounded off by use of a file or other abrasive element in order to restore its original gliding shape.

However, for many applications, a different relative depth between the tops of the depth gauges and the tops of the cutters is desired. For these purposes, the invention provides one or more shim devices 20 which individually comprise an elongated shim strip 20a of uniform thickness and preferably of uniform width adapted to be interposed between the cutters and the underlying surface of the platen 10a, thereby to shim up the platen by the thickness of the shim strip 20a. In order to retain the shim strip in position with relation to the platen, the preferred construction is to provide a reverse bend on one end of the shim strip, and thereby form a clip 20b which is adapted for sliding over and gripping retentively the end of the platen 10a opposite the slotted end of the gauge. For convenience in the insertion of the shim strip within the gauge, the free end of the clip element 20b is turned upwardly at 20b' away from the strip proper in order to form a flared entrance so that it will pass readily over the edge of the platen 10a. The shim device 20 is preferably made of resilient metal such as spring steel of relatively hard properties, so that it will not become abraided or scratched and thereby tend to catch on the sharpened edges of the cutters and destroy the sharpness of those edges. The continuous length of the strip 20a preferably corresponds to the free length of the platen 10a so that the shim will span or overlap the same number of cutters as would the platen without the shim. Obviously, shims of different thickness may be provided, and so marked, in a kit of compact form, packaged with the gauge proper to which they are individually attachable.

Such a device is economical in its manufacture and is very simple to use. With the hardened insets 12, 14 and 21, a grinding tool may be used or a file without danger of affecting the accuracy of the instrument by grinding down the datum surface. Moreover, there are no elements which can lose their adjustment or calibration nor which require special skill in manipulation. There are no elements in the gauge which can be damaged to an extent which would appreciably impair the accuracy of the device.

These and other aspects and advantages of the invention will be obvious to those skilled in the art.

I claim as my invention:

1. An adjustable gauge for dressing the depth gauges of a saw chain to predetermined depth relative to the adjacent chain cutters, said adjustable gauge comprising an elongated platen having a substantially flat lower reference face adapted to rest, extending lengthwise of a straight stretch of the chain, on top of a plurality of successively located saw chain cutters, retaining side members projecting substantially at right angles to and in generally parallel relation from opposite edges of said platen to define a chain-retaining channel therebetween, dressing tool datum means forming a longitudinally extending slot located in transversely substantially centered position relative to said platen and opening endwise from one end thereof to accommodate the tip of a saw chain depth gauge projecting upwardly between the sides of said slot, matrix members carried on the upper side of said datum means adjoining respectively opposite sides of said slot, said matrix members having hardened top surfaces lying substantially in a common reference plane to which the depth gauge is to be dressed, having predetermined offset in relation to the platen reference surface, and at least one detachable adjustment shim means comprising an elongated shim strip of predetermined thickness adapted to be superimposed on said platen reference surface extending along the length thereof to be directly between said surface and the chain cutters, said shim means further comprising a clip-on device carried by one end of the shim strip, resiliently and detachably engageable with the adjustable gauge to maintain said strip positionally in the adjustable gauge.

2. An adjustable gauge for dressing the depth gauges of a saw chain to predetermined depth relative to the adjacent chain cutters, said adjustable gauge comprising an elongated platen having a substantially flat lower reference face adapted to rest, extending lengthwise of a straight stretch of the chain, on top of a plurality of successively located saw chain cutters, retaining side members projecting substantially at right angles to and in generally parallel relation from opposite edges of said platen to define a chain-retaining channel therebetween, dressing tool datum means forming a longitudinally extending slot located in transversely substantially centered position relative to said platen to accommodate the tip of a saw chain depth gauge projecting upwardly between the sides of said slot, matrix members carried on the upper side of said datum means adjoining respectively opposite sides of said slot, said matrix members having hardened top surfaces lying substantially in a common reference plane to which the depth gauge is to be dressed, having predetermined offset in relation to the platen reference surface, and at least one detachable adjustment shim means comprising an elongated shim strip of predetermined thickness adapted to be superimposed on said platen reference surface extending along the length thereof to lie directly between said surface and the chain cutters, said strip having one end reversely bent back along an end portion thereof to form a clip slidable over one end of said platen for resiliently and detachably engaging such platen to maintain said strip positionally in the adjustable gauge.

3. The adjustable gauge defined in claim 2, wherein the datum means matrix members comprise inset strips of materially harder material than said platen.

4. The adjustable gauge defined in claim 3, wherein the platen and retaining side members comprise an integral elongated metal channel, the web of which comprises the platen and the flanges of which comprise the retaining side members, the datum means being formed by removing an end portion of said web to form a notch, bending upper edge portions of the flanges inwardly toward each other in coplanar relationship along the notch, and bonding the matrix inset strips to the top faces of said inbent flanges with separation therebetween to form the notch.

5. The adjustable gauge defined in claim 4, and a protective retainer strip of hard material similar to said inset strip material, bonded to the end of the web adjoining the notch to function as a stop for a dressing tool preventing grinding of the web.

No references cited.